(12) United States Patent
Liu et al.

(10) Patent No.: US 11,660,686 B2
(45) Date of Patent: May 30, 2023

(54) HOLE CHAMFERING DEVICE

(71) Applicant: CITIC Dicastal Co., Ltd., Qinhuangdao (CN)

(72) Inventors: Huiying Liu, Qinhuangdao (CN); Zuo Xu, Qinhuangdao (CN); Hanqi Wu, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 17/367,509

(22) Filed: Jul. 5, 2021

(65) Prior Publication Data
US 2022/0266353 A1    Aug. 25, 2022

(30) Foreign Application Priority Data

Feb. 22, 2021   (CN) .......................... 202110196802.4

(51) Int. Cl.
*B23B 51/10*    (2006.01)

(52) U.S. Cl.
CPC ............ *B23B 51/102* (2013.01); *B23B 51/10* (2013.01); *B23B 51/101* (2013.01); *B23B 51/106* (2013.01); *Y10T 408/868* (2015.01)

(58) Field of Classification Search
CPC ... B23B 51/101; B23B 51/102; B23B 51/106; B23B 51/10; Y10T 408/865; Y10T 408/868
See application file for complete search history.

(56) References Cited

U.S. PATENT DOCUMENTS

| | | | | |
|---|---|---|---|---|
| 963,596 | A * | 7/1910 | Lescure | B23B 51/102 175/286 |
| 2,394,612 | A * | 2/1946 | Horne, Jr. | B23B 51/105 82/15 |
| 2,456,140 | A * | 12/1948 | Mueller | B23B 51/106 29/57 |
| 6,354,772 | B1 * | 3/2002 | Mueller | B23B 51/102 407/45 |
| 6,869,257 | B2 * | 3/2005 | Wiles | B23B 51/101 408/54 |
| 8,721,233 | B2 * | 5/2014 | Burr | B23B 51/101 408/187 |

FOREIGN PATENT DOCUMENTS

CN           108480721 A  *  9/2018

* cited by examiner

*Primary Examiner* — Eric A. Gates
(74) *Attorney, Agent, or Firm* — IPro, PLLC

(57) ABSTRACT

The present disclosure belongs to the technical field of hole machining equipment, and provides a hole chamfering device including blades in bilateral symmetry and a blade posture adjusting assembly. The hole chamfering device not only can be fed from the front face of a hole to complete chamfering work on the front face of the hole, but also can solve the problem of chamfering the back face of the hole under the condition that a chamfering tool cannot be directly fed from the back face of the hole. The hole chamfering device can be fed from the front face of the hole to complete chamfering work on the front face and the back face of the hole, and meanwhile, can remove burrs in the hole, thereby meeting the machining requirement of conventional chamfering of the hole.

9 Claims, 3 Drawing Sheets

HOLE CHAMFERING DEVICE

TECHNICAL FIELD

The present disclosure relates to the technical field of hole machining equipment, in particular to a hole chamfering device.

BACKGROUND

In the manufacturing process of automobile parts, front faces and back faces of a large number of holes need to be chamfered, if all the holes are processed through a chamfering tool of a machine tool, the production takt is increased, the production efficiency is reduced, and for hole chamfering only requiring to remove burrs at edges of holes, manual removal is more economical and practical. For double-lug holes of some parts such as an auxiliary frame, due to the specificity of the structure, no operation space exists for chamfering of back faces of the holes, a tool cannot be directly fed from the back faces of the holes for removal, and the tool can only be fed from the front faces of the holes, based on the current situation, the present disclosure provides a chamfering device which can solve the hole chamfering problem under the condition that a tool cannot be directly fed from the back face of the hole.

SUMMARY

An embodiment of the present disclosure provides a hole chamfering device, which can solve the machining problem of chamfering the back face of a hole under the condition that a tool cannot be directly fed from the back face of the hole, can be fed from the front face of the hole to complete chamfering work on the front face and the back face of the hole, and meanwhile, remove burrs in the hole, thereby meeting the machining requirement of conventional chamfering of the hole.

In order to achieve the purpose, the present disclosure provides the following technical solution:

in an embodiment of the present disclosure, a hole chamfering device is provided, and includes blades in bilateral symmetry and a blade posture adjusting assembly, wherein the blades are single-cutting-edge blades, and the blade posture adjusting assembly can adjust the cutting edges of the two blades to be in at least three postures: in the first posture, the cutting edges of the two blades are inclined from outside to inside from top to bottom; in the second posture, the cutting edges of the two blades are kept vertical; and in the third posture, the cutting edges of the two blades are inclined from inside to outside from top to bottom.

In some embodiments, the blade posture adjusting assembly includes a nut plate, a screw, a knob, a rotating shaft, a bearing, a bearing block, roll shaft supports, gears and racks; a threaded hole is formed in the middle position of the nut plate, the screw is arranged in the threaded hole, and external threads of the screw are matched with internal threads of the threaded hole; the knob is fixed at the top end of the screw, the rotating shaft is fixed at the bottom end of the screw, the central axis of the rotating shaft is superposed to the central axis of the screw, the rotating shaft is fixedly connected with an inner ring of the bearing, and an outer ring of the bearing is fixed to the inner wall of the bearing block; the two racks in the vertical direction are fixed to the outer side wall of the bearing block in a bilateral symmetry mode, the two roll shaft supports in the vertical direction are fixedly arranged on the bottom face of the nut plate in a bilateral symmetry mode, a roll shaft at the bottom end of each roll shaft support is provided with one gear, and the two gears are meshed with the two racks respectively; and the blades are fixed to the left gear and the right gear respectively, and the two blades are in bilateral symmetry about the central axis of the rotating shaft.

In some embodiments, a handle is fixed on the top face of the nut plate.

In some embodiments, the rotating shaft is in interference fit with the inner ring of the bearing.

In some embodiments, a bearing end cap is arranged at the upper end of the bearing block.

In some embodiments, the blade posture adjusting assembly includes a knob, a flange plate, a push rod, a fastening screw, a sleeve, a limiting end cap, a connecting plate, roll shaft supports, gears and racks; a threaded hole communicating with a center hole of the flange plate is formed in the side wall of the flange plate in the horizontal direction, and the fastening screw is mounted in the threaded hole and used for fixing the push rod; the sleeve is fixed to the bottom of the flange plate, the limiting end cap is mounted at the bottom of the sleeve, and a through hole allowing the push rod to pass through is formed in the central position of the limiting end cap; the knob is mounted at the top end of the push rod, the push rod passes through the center hole of the flange plate, the sleeve and the through hole, the connecting plate is mounted at the bottom of the push rod, and the two racks are mounted on the connecting plate in a bilateral symmetry mode in the vertical direction; the two roll shaft supports in the vertical direction are fixedly arranged on the bottom face of the flange plate in a bilateral symmetry mode, a roll shaft at the bottom end of each roll shaft support is provided with one gear, and the two gears are meshed with the two racks respectively; and the blades are fixed to the left gear and the right gear respectively, and the two blades are in bilateral symmetry about the central axis of the push rod.

In some embodiments, two slideways are symmetrically arranged in the sleeve, two slide rails are fixedly arranged on the outer surface of the push rod, and the slide rails are matched with the slideways in the sleeve.

Compared with the prior art, the present disclosure has the beneficial effects that:

the present disclosure provides the hole chamfering device including blades in bilateral symmetry and a blade posture adjusting assembly, which not only can be fed from the front face of a hole to complete chamfering work on the front face of the hole, but also can solve the problem of chamfering the back face of the hole under the condition that a tool cannot be directly fed from the back face of the hole. The hole chamfering device can be fed from the front face of the hole to complete chamfering work on the front face and the back face of the hole, and meanwhile, can remove burrs in the hole, thereby meeting the machining requirement of conventional chamfering of a hole.

Wherein: 1—handle, 2—knob, 3—nut plate, 4—screw, 5—bearing end cap, 6—bearing block, 7—first roll shaft support, 8—first gear, 9—first blade, 10—first rack, 11—rotating shaft, 12—bearing, 13—second roll shaft support, 14—second gear, 15—second blade, 16—second rack, 17—flange plate, 18—push rod, 19—fastening screw, 20—slide rail, 21—sleeve, 22—limiting end cap, and 23—connecting plate.

DETAILED DESCRIPTION OF THE EMBODIMENTS

Embodiment 1

An embodiment 1 of the present disclosure provides a hole chamfering device, as shown in FIG. 1 to FIG. 4, the hole chamfering device includes blades in bilateral symmetry and a blade posture adjusting assembly, wherein the blade posture adjusting assembly can adjust cutting edges of the two blades to be in at least three postures, in the first posture, the cutting edges of the two blades are inclined from outside to inside from top to bottom; in the second posture, the cutting edges of the two blades are kept vertical; and in the third posture, the cutting edges of the two blades are inclined from inside to outside from top to bottom.

Figure 1:
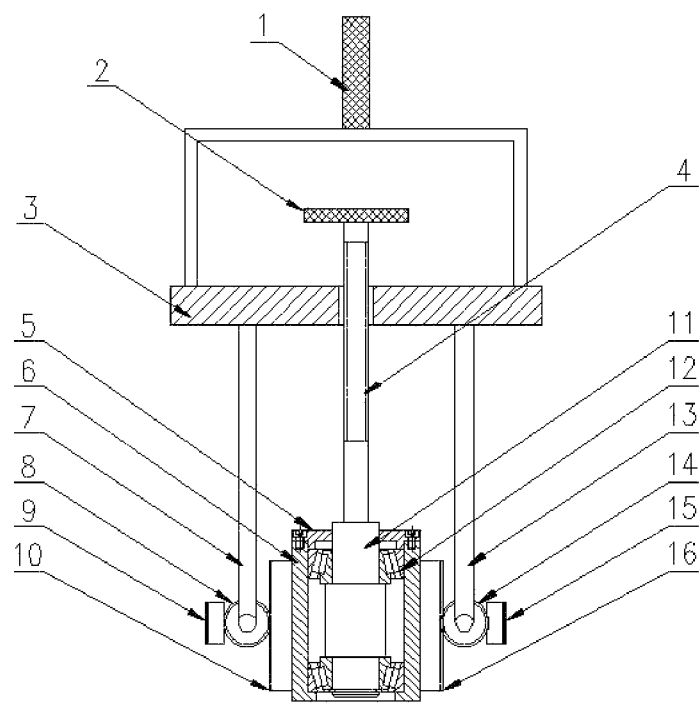
FIG. 1 is a structural schematic diagram of a hole chamfering device according to the present disclosure.

As shown in FIG. 1, the hole chamfering device includes a handle 1, a knob 2, a nut plate 3, a screw 4, a bearing end cap 5, a bearing block 6, a first roll shaft support 7, a first gear 8, a first blade 9, a first rack 10, a rotating shaft 11, a bearing 12, a second roll shaft support 13, a second gear 14, a second blade 15 and a second rack 16.

The handle 1 is fixed on the top face of the nut plate 3. The screw 4 is in threaded fit with the nut plate 3, as shown in the figures, a threaded hole is formed in the middle position of the nut plate 3, the screw 4 is arranged in the threaded hole, and external threads of the screw 4 are matched with internal threads of the threaded hole. The knob 2 is fixed at the top end of the screw 4, the bottom end of the screw 4 is fixedly connected with the rotating shaft 11, and the central axis of the rotating shaft 11 is superposed to the central axis of the screw 4. The rotating shaft 11 is in interference fit with the inner ring of the bearing 12 and is fixedly connected with the inner ring of the bearing 12, and the outer ring of the bearing 12 is fixed to the inner wall of the bearing block 6. The first rack 10 and the second rack 16 in the vertical direction are fixedly mounted on the outer wall of the bearing block 6 in a bilateral symmetry mode. The first roll shaft support 7 and the second roll shaft support 13 in the vertical direction are fixedly arranged on the bottom face of the nut plate 3 in a bilateral symmetry mode, the first gear 8 is mounted on a roll shaft at the bottom end of the first roll shaft support 7, and the second gear 14 is mounted on a roll shaft at the bottom end of the second roll shaft support 13. The first rack 10 is meshed with the first gear 8, the first gear 8 is mounted on the first roll shaft support 7, and the first roll shaft support 7 is fixed to the nut plate 3. The second rack 16 is meshed with the second gear 14, the second gear 14 is mounted on the second roll shaft support 13, and the second roll shaft support 13 is fixed to the nut plate 3. The first blade 9 and the second blade 15 are in bilateral symmetry about the central axis of the rotating shaft 11, and are respectively fixed to the first gear 8 and the second gear 14.

Figure 2:
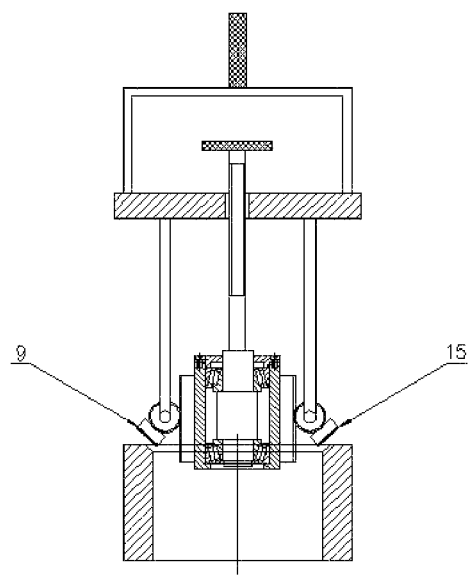
FIG. 2 is a state schematic diagram of the hole chamfering device which processes chamfers on the front face of a hole according to the present disclosure.

As shown in FIG. 2, when the front face of a hole is chamfered, the knob 2 is firstly rotated, the screw 4 can drive the rotating shaft 11 to rotate, under the action of threaded fit, the screw 4 rotates to drive the rotating shaft 11 to ascend, the rotating shaft 11 pulls the bearing block 6 to ascend, the bearing block 6 ascends to drive the first rack 10 and the second rack 16 to ascend synchronously, and under the meshing action of the gears and the racks, the first gear 8 and the second gear 14 rotate synchronously, so that the first blade 9 and the second blade 15 form a V shape, namely, the cutting edges of the two blades are inclined from outside to inside from top to bottom to be in a first posture, then the handle 1 is held, the hole chamfering device can be directly fed in the forwards direction, and carries out chamfering from the front face of the hole.

Figure 3:
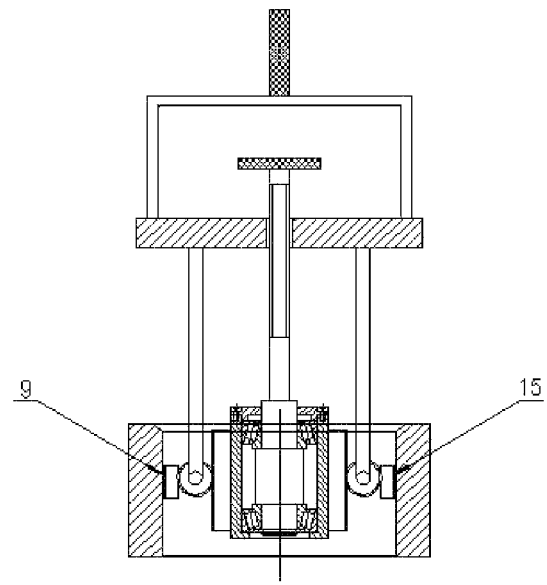
FIG. 3 is a state schematic diagram of the hole chamfering device which removes burrs in the hole according to the present disclosure.
Figure 4:
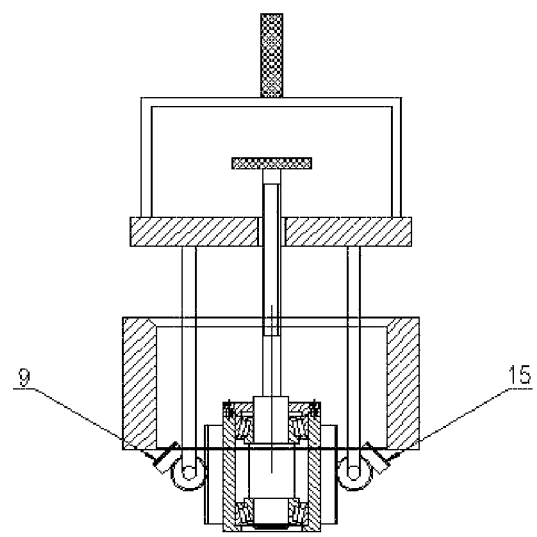
FIG. 4 is a state schematic diagram of the hole chamfering device which processes chamfers on the back face of the hole according to the present disclosure.

As shown in FIG. 3 to FIG. 4, when the back face of the hole is chamfered, firstly, the first blade 9 and the second blade 15 of the device are kept in a vertically downward posture, namely, the cutting edges of the two blades are kept in a vertical second posture to enable the blades to pass through the inner wall of the hole, and at the moment, burrs on the inner wall of the hole can also be removed; then the knob 2 is rotated, the screw 4 can drive the rotating shaft 11 to rotate, under the action of threaded fit, the screw 4 rotates to drive the rotating shaft 11 to descend, the rotating shaft 11 drives the bearing block 6 to descend, the bearing block 6 descends to drive the first rack 10 and the second rack 16 to descend synchronously, under the meshing action of the gears and the racks, the first gear 8 and the second gear 14 rotate synchronously, so that the first blade 9 and the second blade 15 form an inverted V shape, namely, the cutting edges of the two blades are inclined from inside to outside from top to bottom to be in a third posture, then the handle 1 is held, the device is lifted to enable the blades to make contact with the edge of the inner wall of the back face of the hole, and the device is rotated by a circle to chamfer the back face of the hole. After chamfering is completed, the first blade 9 and the second blade 15 are restored to be in the vertical downward posture, namely, the cutting edges of the two blades are kept in the vertical second posture, and then the blades are withdrawn along the inner wall of the hole, and thus, chamfering of the back face of one hole is completed.

Embodiment 2

Figure 5:
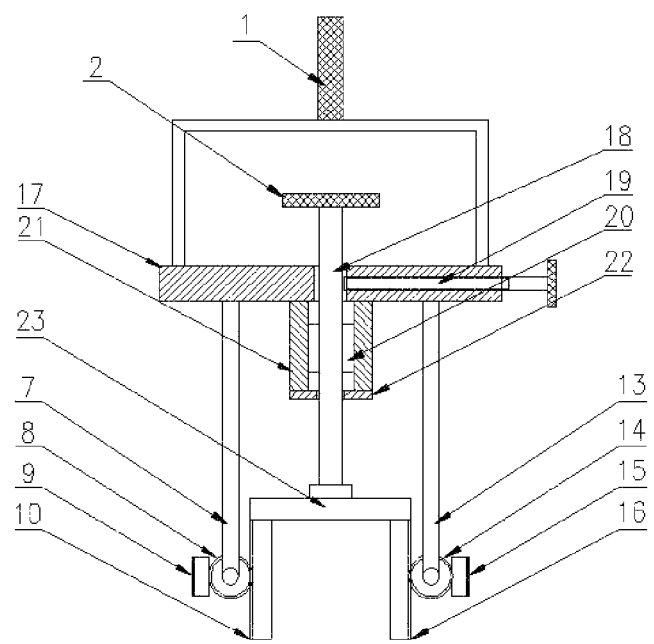
FIG. 5 is a structural schematic diagram of a hole chamfering device according to another embodiment of the present disclosure.

An embodiment 2 of the present disclosure provides a hole chamfering device, as shown in FIG. 5, the hole chamfering device includes blades in bilateral symmetry and a blade posture adjusting assembly, wherein the blades are single-cutting-edge blades, the blade posture adjusting assembly can adjust the cutting edges of the two blades to be in at least three postures, in the first posture, the cutting edges of the two blades are inclined from outside to inside from top to bottom; in the second posture, the cutting edges of the two blades are kept vertical; and in the third posture, the cutting edges of the two blades are inclined from inside to outside from top to bottom.

As shown in FIG. 5, the hole chamfering device includes a handle 1, a knob 2, a first roll shaft support 7, a first gear 8, a first blade 9, a first rack 10, a second roll shaft support 13, a second gear 14, a second blade 15, a second rack 16, a flange plate 17, a push rod 18, a fastening screw 19, slide rails 20, a sleeve 21, a limiting end cap 22 and a connecting plate 23.

The blade posture adjusting assembly includes the handle 1, the knob 2, the flange plate 17, the push rod 18, the fastening screw 19, the slide rails 20, the sleeve 21, the limiting end cap 22, the connecting plate 23, the first roll shaft support 7, the second roll shaft support 13, the first gear 8, the second gear 14, the first rack 10 and the second rack 16. The handle 1 is fixed at the top end of the flange plate 17, a threaded hole which communicates with a center hole of the flange plate is formed in the side wall of the flange plate 17 in the horizontal direction, and the fastening screw 19 is mounted in the threaded hole and used for fixing the push rod, as shown in FIG. 5. The sleeve 21 is fixed at the bottom of the flange plate 17, and two slideways are symmetrically arranged in the sleeve 21. The limiting end cap 22 is mounted at the bottom of the sleeve 21, and is used for limiting the push rod 18 to only have a stroke in the vertical direction, and a through hole allowing the push rod 18 to pass through is formed in the central position of the limiting end cap 22. The knob 2 is mounted at the top end of the push rod 18, the push rod 18 passes through the center hole of the flange plate, the sleeve 21 and the through hole, the connecting plate 23 is fixedly mounted on the bottom of the push rod, and the first rack 10 and the second rack 16 are symmetrically mounted on the connecting plate 23 in the vertical direction. The two slide rails 20 are fixed on the outer surface of the push rod 18, and the slide rails 20 are matched with the slideways in the sleeve 21. The first roll shaft support 7 and the second roll shaft support 13 in the vertical direction are fixedly arranged on the bottom face of the flange plate 17 in a bilateral symmetry mode, the first gear 8 is mounted on a roll shaft at the bottom end of the first roll shaft support 7, and the second gear 14 is mounted on a roll shaft at the bottom end of the second roll shaft support 13. The first rack 10 is meshed with the first gear 8, the first gear 8 is mounted on the first roll shaft support 7, and the first roll shaft support 7 is fixed on the flange plate 17. The second rack 16 is meshed with the second gear 14, the second gear 14 is mounted on the second roll shaft support 13, and the second roll shaft support 13 is fixed on the flange plate 17. The first blade 9 and the second blade 15 are in bilateral symmetry about the central axis of the push rod 18, and are respectively fixed on the first gear 8 and the second gear 14.

When the front face of the hole is chamfered, the push rod 18 is lifted through the knob 2, so that the first blade 9 and the second blade 15 can be in the first posture, the cutting edges of the two blades are inclined from outside to inside from top to bottom, the push rod 18 can be locked through the fastening screw 19, meanwhile, the blades are locked, and at the moment, the front face of the hole can be chamfered.

When the back face of the hole is chamfered, firstly, the first blade 9 and the second blade 15 of the device are kept in a vertically downward posture, namely, the cutting edges of the two blades are kept in a vertical second posture to enable the blades to pass through the inner wall of the hole, and at the moment, burrs on the inner wall of the hole can also be removed; then the push rod 18 is pushed downwards through the knob 2, the slide rails 20 vertically slide downwards in the slideways, the push rod 18 pushes the racks to move, and under the meshing action of the gears and the racks, the first gear 8 and the second gear 14 rotate synchronously, so that the first blade 9 and the second blade 15 form an inverted V shape, namely the cutting edges of the two blades are inclined from inside to outside from top to bottom to be in a third posture, then the blades are locked through the fastening screw 19, the handle 1 is held, the device is lifted to enable the blades to make contact with the edge of the inner wall of the back face of the hole, and the device is rotated by a circle to chamfer the back face of the hole. After chamfering is completed, the first blade 9 and the second blade 15 are restored to be in the vertical downward posture, namely, the cutting edges of the two blades are kept in the vertical second posture, and then the blades are withdrawn along the inner wall of the hole, and thus, chamfering of the back face of one hole is completed.

The hole chamfering device provided by the present disclosure includes the blades in bilateral symmetry and the blade posture adjusting assembly, not only can be fed from the front face of a hole to complete chamfering work on the front face of the hole, but also can solve the problem of chamfering the back face of a hole under the condition that the tool cannot be directly fed from the back face of the hole. The hole chamfering device can be fed from the front face of the hole to complete chamfering work on the front face and the back face of the hole, and meanwhile, can remove burrs in the hole, thereby meeting machining requirements of conventional chamfering of a hole. In addition, innovative functions are fulfilled through combination of conventional mechanical parts, electronic components are not needed, the structure is novel, the conception is ingenious, thread self-locking is efficient and stable, and the practical application value is quite high.

What is claimed is:

1. A hole chamfering device, comprising two blades in bilateral symmetry and a blade posture adjusting assembly, wherein the two blades are single-cutting-edge blades, the blade posture adjusting assembly can adjust the cutting edges of the two blades to be in at least three postures,
   in the first posture, the cutting edges of the two blades are inclined from outside to inside from top to bottom;
   in the second posture, the cutting edges of the two blades are kept vertical; and
   in the third posture, the cutting edges of the two blades are inclined from inside to outside from top to bottom.

2. The hole chamfering device according to claim 1, wherein the blade posture adjusting assembly comprises a plate, a rod, two roll shaft supports, two gears and two racks,
   the two racks are fixed in the vertical direction in a bilateral symmetry mode, the two racks are configured to be driven by the rod to ascend or descend,
   the two roll shaft supports in the vertical direction are fixedly arranged on a bottom face of the plate in a bilateral symmetry mode,
   a roll shaft at a bottom end of each roll shaft support is provided with one gear of the two gears, and the two gears are respectively meshed with the two racks, and
   the two blades are respectively fixed on the two gears, and the two blades are in bilateral symmetry about the central axis of the rotating shaft.

3. The hole chamfering device according to claim 2, wherein the blade posture adjusting assembly further comprises a knob, a rotating shaft, a bearing and a bearing block;
   the plate is a nut plate, the rod is a screw;
   a threaded hole is formed in a middle position of the nut plate, the screw is arranged in the threaded hole, and external threads of the screw are matched with internal threads of the threaded hole;
   the knob is fixed at a top end of the screw, the rotating shaft is fixed at a bottom end of the screw, a central axis of the rotating shaft is superposed to a central axis of the screw, the rotating shaft is fixedly connected with an inner ring of the bearing, and an outer ring of the bearing is fixed on an inner wall of the bearing block;

the two racks are fixed on an outer side wall of the bearing block.

4. The hole chamfering device according to claim 3, wherein a handle is fixed on a top face of the nut plate.

5. The hole chamfering device according to claim 3, wherein the rotating shaft is in interference fit with the inner ring of the bearing.

6. The hole chamfering device according to claim 3, wherein a bearing end cap is arranged at an upper end of the bearing block.

7. The hole chamfering device according to claim 2, wherein the blade posture adjusting assembly further comprises a knob, a fastening screw, a sleeve, a limiting end cap and a connecting plate;

the plate is a flange plate, the rod is a push rod;

a threaded hole which communicates with a center hole of the flange plate is formed in a side wall of the flange plate in a horizontal direction, and the fastening screw is mounted in the threaded hole and is used for fixing the push rod;

the sleeve is fixed at the bottom of the flange plate, the limiting end cap is mounted at the bottom of the sleeve, and a through hole allowing the push rod to pass through is formed in a central position of the limiting end cap;

the knob is mounted at a top end of the push rod, the push rod passes through the center hole of the flange plate, the sleeve and the through hole;

the connecting plate is mounted at the bottom of the push rod; and the two racks are mounted on the connecting plate.

8. The hole chamfering device according to claim 7, wherein two slideways are symmetrically arranged in the sleeve, two slide rails are fixedly arranged on an outer surface of the push rod, and the slide rails are matched with the slideways in the sleeve.

9. The hole chamfering device according to claim 7, wherein a handle is fixed on a top face of the flange plate.

* * * * *